US012565961B2

(12) United States Patent (10) Patent No.: US 12,565,961 B2
Jimenez et al. (45) Date of Patent: Mar. 3, 2026

(54) QUICK RELEASE BIPOD ADAPTER PLATE

(71) Applicant: Magpul Industries Corp., Austin, TX (US)

(72) Inventors: Libardo Jimenez, Arvada, CO (US); Timothy Eric Roberts, Broomfield, CO (US)

(73) Assignee: Magpul Industries Corp., Austin, TX (US)

( * ) Notice: Subject to any disclaimer, the term of this patent is extended or adjusted under 35 U.S.C. 154(b) by 0 days.

(21) Appl. No.: 18/271,730

(22) PCT Filed: Jan. 11, 2022

(86) PCT No.: PCT/US2022/011923
§ 371 (c)(1),
(2) Date: Jul. 11, 2023

(87) PCT Pub. No.: WO2022/150745
PCT Pub. Date: Jul. 14, 2022

(65) Prior Publication Data
US 2024/0318765 A1 Sep. 26, 2024

Related U.S. Application Data

(60) Provisional application No. 63/135,922, filed on Jan. 11, 2021.

(51) Int. Cl.
*B25B 1/10* (2006.01)
*B25B 1/24* (2006.01)
*F16M 11/04* (2006.01)

(52) U.S. Cl.
CPC ................................. *F16M 11/041* (2013.01)

(58) Field of Classification Search
CPC ..... B25B 1/103; B25B 1/2478; B25B 1/2489; B25B 1/2473; F16M 11/041; F16M 13/00;
(Continued)

(56) References Cited

U.S. PATENT DOCUMENTS 3,356,325 A * 12/1967 Schnase ............. F16M 11/2021
396/419
4,934,674 A * 6/1990 Bernstein ................ B25B 1/103
269/154
(Continued)

FOREIGN PATENT DOCUMENTS

CN 103415735 A * 11/2013 ................ F16B 2/12
CN 105252306 A 1/2016
(Continued)

OTHER PUBLICATIONS

"A.R.M.S.® #17®S MK-II Lever® Mount", A.R.M.S., Inc., 1 page, online available at <www.armsmounts.com/shop/mounts/r-m-s-17s-mk-ii-lever-mount/>, Known as early as Jan. 16, 2024.
(Continued)

*Primary Examiner* — Mahdi H Nejad
(74) *Attorney, Agent, or Firm* — NOD Law PC

(57) ABSTRACT
This disclosure describes systems, methods, and apparatus for a quick-release adapter between two tripod/bipod/monopod interfaces, wherein a clamping side of the adapter is configured to clamp onto two different types of interfaces or rails such as Arca and Picatinny/Weaver/NATO.

16 Claims, 13 Drawing Sheets

(58) Field of Classification Search

CPC ............. F16M 2200/027; F16M 11/16; F16M 2200/028; F16M 11/04; F16M 11/048; F41G 11/003

USPC ...................................................... 248/187.1

See application file for complete search history.

(56) References Cited

U.S. PATENT DOCUMENTS

| | | | |
|---|---|---|---|
| 5,860,197 A * | 1/1999 | Fox | B25B 1/103 |
| | | | 24/522 |
| 6,349,929 B1 * | 2/2002 | Speltz | B25B 1/2489 |
| | | | 269/224 |
| 7,185,862 B1 * | 3/2007 | Yang | F16M 11/041 |
| | | | 396/428 |
| 7,430,828 B2 | 10/2008 | Munst | |
| 7,493,721 B2 | 2/2009 | Swan | |
| 7,562,485 B2 | 7/2009 | Newhall et al. | |
| 7,685,759 B2 | 3/2010 | Teetzel | |
| 7,712,242 B2 | 5/2010 | Matthews et al. | |
| 7,739,824 B1 | 6/2010 | Swan | |
| 7,757,422 B1 | 7/2010 | Swan | |
| 7,823,316 B2 | 11/2010 | Storch et al. | |
| 7,941,960 B2 | 5/2011 | Matthews et al. | |
| 8,020,335 B2 | 9/2011 | Larsson et al. | |
| 8,276,307 B2 | 10/2012 | Deros | |
| 8,397,421 B2 | 3/2013 | Ding et al. | |
| 8,438,965 B2 | 5/2013 | Collin et al. | |
| 9,364,937 B2 | 6/2016 | Taylor et al. | |
| 9,395,158 B2 | 7/2016 | Collin et al. | |
| 9,599,431 B2 | 3/2017 | Griffin | |
| 10,054,401 B2 | 8/2018 | Kolvek et al. | |
| 10,132,596 B2 | 11/2018 | Bartoszewicz | |
| 10,557,487 B2 | 2/2020 | Larue | |
| 10,578,404 B2 | 3/2020 | Swan | |
| 10,612,718 B2 | 4/2020 | Johnson, Sr. et al. | |
| 10,690,287 B2 | 6/2020 | Chen | |
| 10,883,650 B2 | 1/2021 | Johnson, Sr. et al. | |
| 2007/0163163 A1 | 7/2007 | Munst | |
| 2010/0164158 A1 * | 7/2010 | Weissenborn | A63C 11/26 |
| | | | 269/282 |
| 2011/0316212 A1 * | 12/2011 | Jones | B25B 1/103 |
| | | | 269/181 |
| 2014/0131933 A1 | 5/2014 | Taylor et al. | |
| 2014/0227021 A1 | 8/2014 | Kamen et al. | |
| 2015/0129639 A1 | 5/2015 | Miller | |
| 2017/0227323 A1 * | 8/2017 | Hines | F41C 27/18 |
| 2018/0180374 A1 * | 6/2018 | Roberts | F41A 23/10 |
| 2019/0101362 A1 | 4/2019 | Stewart | |
| 2019/0128470 A1 * | 5/2019 | Johnson, Sr. | F41G 11/003 |
| 2019/0331459 A1 * | 10/2019 | Johnson, Sr. | F41G 11/003 |

FOREIGN PATENT DOCUMENTS

| | | | |
|---|---|---|---|
| CN | 107655363 B | | 5/2023 |
| DE | 202015103174 | * | 6/2015 |
| DE | 202015103174 U1 | * | 6/2015 |
| EP | 3 064 823 B1 | | 9/2017 |
| TW | 222134 U | | 4/1994 |
| TW | M478775 U | | 5/2014 |
| TW | M558379 U | | 4/2018 |
| TW | 202241647 A | | 11/2022 |
| TW | I809654 B | | 7/2023 |
| WO | 2018/039947 A1 | | 3/2018 |
| WO | 2022/150745 A1 | | 7/2022 |

OTHER PUBLICATIONS

"AD-170-S Base", American Defense MFG, 2 pages, online available at <https://www.admmfg.com/170-s>, Known as early as Jan. 16, 2024.

"Arcalock Clamp", Area419, 2 pages, online available at <https://www.area419.com/product/arcalock-clamp/>, Known as early as Jan. 16, 2024.

International Preliminary Report on Patentability Chapter II received for International PCT Application Serial No. PCT/US2022/011923 mailed on Aug. 25, 2023, 8 pages.

International Search Report and Written Opinion received for International PCT Application Serial No. PCT/US2022/011923 mailed on Apr. 19, 2022, 8 pages.

"LaRue Tactical Upgrade LT271", SKU: LT271-c, 15 pages, online available at <https://www.larue.com/products/larue-tactical-upgrade-lt271/>, Known as early as Jan. 16, 2024.

"SMALLRIG Cage for Z cam E2 Camera, Camera Cage with NATO Rail and Swiss Plate for Arca 2264", Amazon, 5 pages, online available at <https://www.amazon.com/SMALLRIG-Cage-Camera-Swiss-Plate/dp/B07M6QWDGZ>, Known as early as Jan. 16, 2024.

Office Action received for Taiwan Patent Application Serial No. 111101172 dated Dec. 15, 2022, 22 pages.

"CompM4™ Red Dot Reflex Sight—QRP2 Mount", Aimpoint, 4 pages, online available at <https://www.aimpoint.com/product/aimpoint-compm4/>, Known as early as Jan. 16, 2024.

"Really Right Stuff 17-S BTC-Pro Clamp", Brownells, 3 pages, online available at <https://soar.reallyrightstuff.com/BTC-Pro-Clamp-for-Atlas-Bipod>, Known as early as Jan. 16, 2024.

Counterpart European patent application No. 22737280.2, filed Jun. 13, 2013. Extended European Search Report dated Jul. 16, 2024. 8 pages.

Office Action received for Chinese Application Serial No. 202280009648.8 dated Jun. 25, 2025, 18 pages.

* cited by examiner

182

184

1050

1050

1200

```
┌─────────────────────────────────────┐
│ Rotate threaded rod or knob in first │
│   direction to create opening for    │
│          insertion of mount          │
│                 1202                  │
└─────────────────────────────────────┘
                   │
                   ▼
┌─────────────────────────────────────┐
│ Insert Arca or Picatinny / Weaver /  │
│   NATO mount into opening between     │
│                wings                  │
│                 1204                  │
└─────────────────────────────────────┘
                   │
                   ▼
┌─────────────────────────────────────┐
│ Rotate knob in second direction and  │◄──┐
│   clamp mount between wings and body  │   │
│                 1206                  │   │
└─────────────────────────────────────┘   │
                   │                       │ No
                   ▼                       │
            ╱ Wings fully ╲                │
           ╱  closed on    ╲               │
          ╱ Arca or Picatinny╲─────────────┘
          ╲  / Weaver / NATO  ╱
           ╲    mount?       ╱
            ╲   1208        ╱
                   │
                  Yes
                   ▼
           ┌──────────────┐
           │     End      │
           └──────────────┘
```

FIG. 12

QUICK RELEASE BIPOD ADAPTER PLATE

CLAIM OF PRIORITY UNDER 35 U.S.C. § 119

The present application for patent claims priority to Provisional Application No. 63/135,922 entitled "QUICK RELEASE BIPOD ADAPTER PLATE" filed Jan. 11, 2021, and assigned to the assignee hereof and hereby expressly incorporated by reference herein.

FIELD OF THE DISCLOSURE

The present disclosure relates generally to bipods. In particular, but not by way of limitation, the present disclosure relates to systems, methods and apparatuses for a quick release adapter plate.

DESCRIPTION OF RELATED ART

Two primary rail interfaces dominate the firearm bipod field: Arca and Picatinny/Weaver. Most bipods can attach to one of these two rails on a bottom of a forend and in some cases adapters can be used to allow interchangeability between these two rail types. Similarly, photography equipment is often bipod mounted via one of these two rail interfaces with an adapter that screws into a threaded aperture on a bottom of the camera. In both the firearms and photographic spaces, there is a need for bipod, tripod, and monopod adapters that can interface with either the Arca or Picatinny/Weaver structure.

REALLY RIGHT STUFF has developed a BTC-PRO CLAMP for the ATLAS Bipod that can clamp onto ATLAS's 1.5" standard dovetail, SOAR custom chassis mount, multi-purpose rail, full-length chassis RRS/Arca rails, and Picatinny/Weaver rails. The BTC-PRO CLAMP includes an inverted valley and two screw apertures therethrough allowing one to affix the CLAMP to an ATLAS-style bipod with two screws. The top of the CLAMP features two clamping channels of different widths and at different depths with an adjustable side of the CLAMP enabling coupling to either Arca or Picatinny/Weaver rails, as seen in U.S. Pat. Nos. 10,612,718, 10,883,650 and U.S. Patent Application No. 2019/0331459. However, the two different channels are arranged at different levels in the CLAMP, and have different widths, making the CLAMP somewhat bulky and heavy.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as an apparatus for selectively engaging a photographic or firearm mount. The apparatus can include a proximal wing comprising a first angled face, a distal wing comprising a second angled face, and a body arranged between the proximal and distal wings. The first and second angled faces are angled from a vertical plane toward the body, and wherein the proximal and distal wings are configured to slide toward each other such that the first and second angled faces clamp the photographic or firearm mount to the body.

Other embodiments of the disclosure may also be characterized as a quick-release adapter for coupling a support to a photographic or firearm mount. The quick-release adapter can include a proximal wing, a distal wing, a body arranged between the proximal and distal wings; and a threaded rod extending between threaded apertures in the proximal and distal wings and through a non-threaded aperture in the body.

Other embodiments of the disclosure can be characterized as a method for coupling to a photographic or firearm mount. The method can include rotating a threaded rod of an adapter in a first direction thereby causing two opposing wings of the adapter to move apart with a body arranged therebetween. The method can also include arranging the mount in contact with the body between the two opposing wings. The method can further include rotating the threaded rod in a second direction thereby causing the two opposing wings of the adapter move toward each other and clamp the mount between the angled faces of the two wings and the body.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

FIG. 12 illustrates a method of using a QR adapter according to an embodiment of this disclosure.

DETAILED DESCRIPTION

Figure 1:
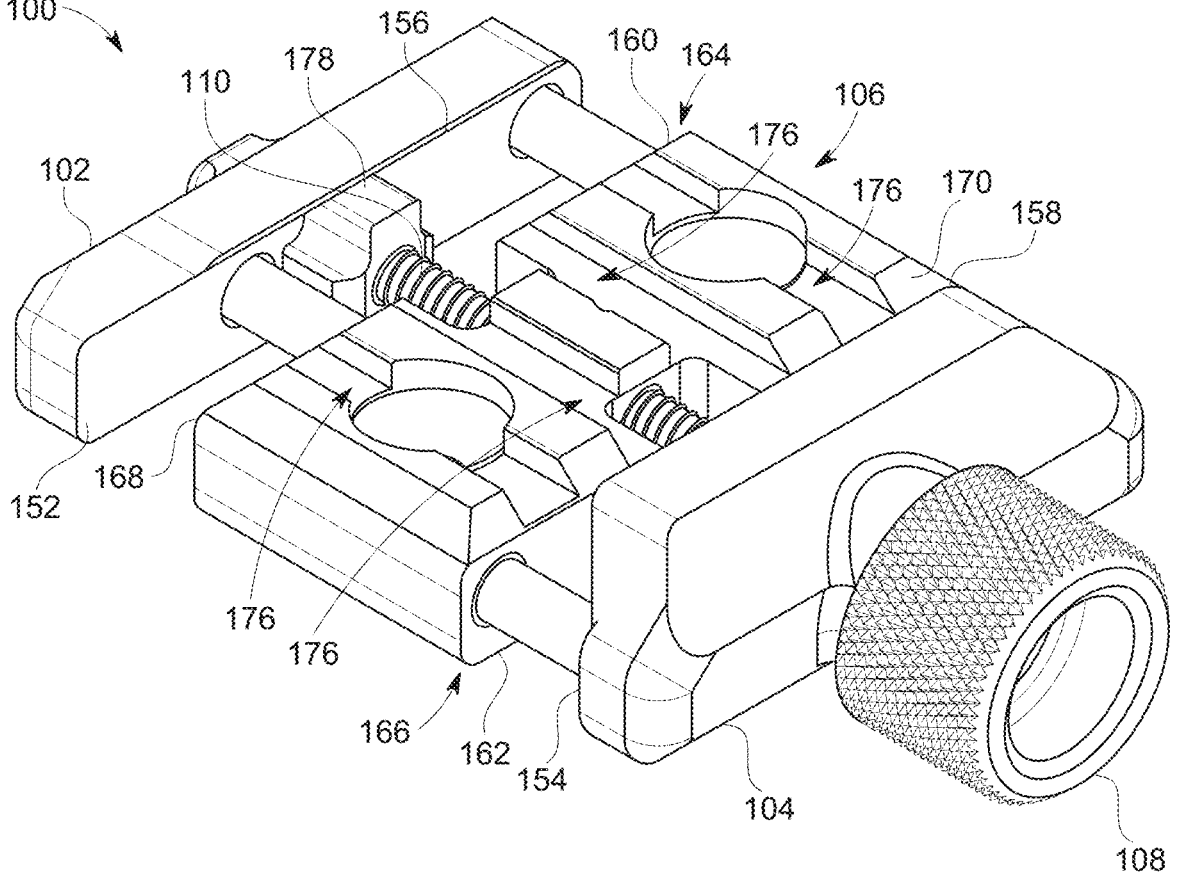
FIG. 1 illustrates an embodiment of a QR adapter in a fully-opened state.
Figure 2:
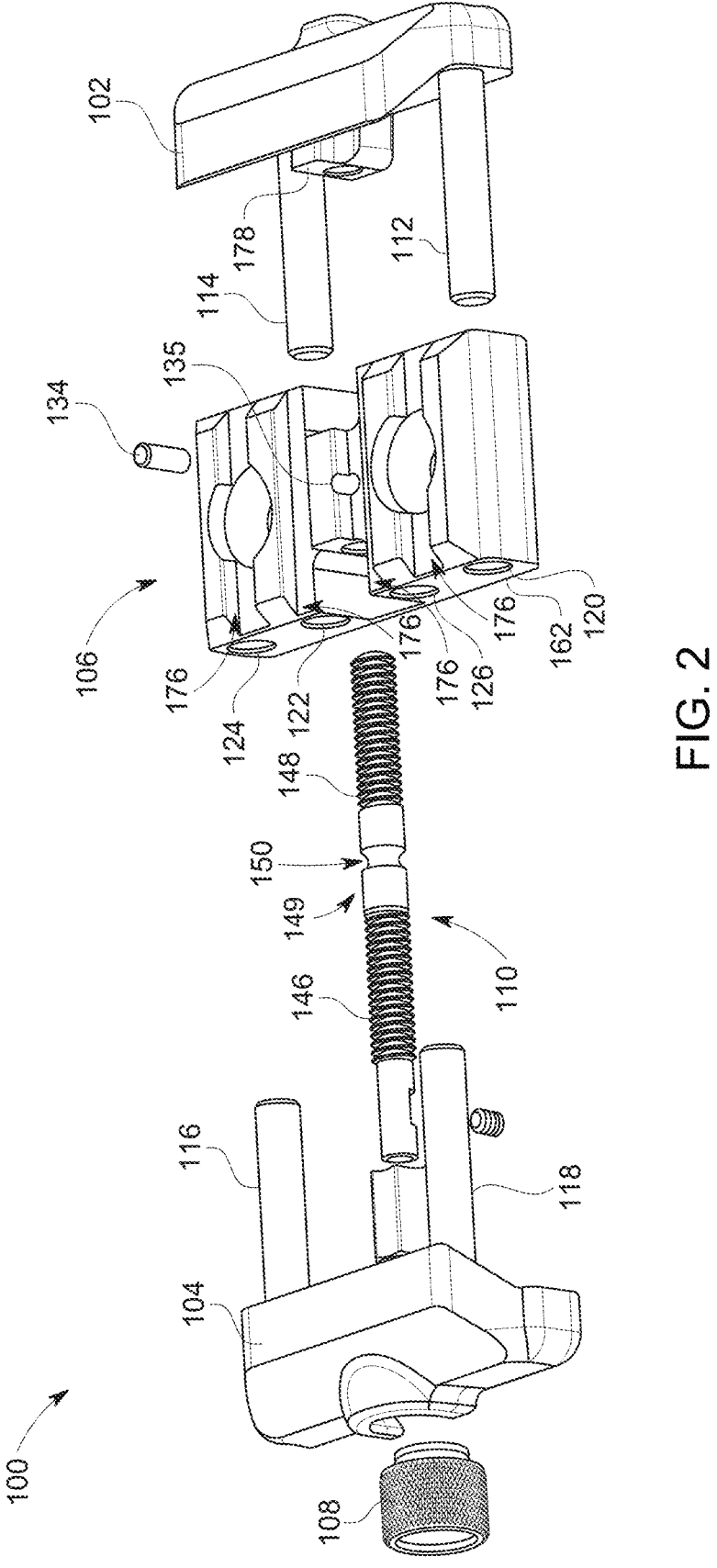
FIG. 2 illustrates an exploded view of the QR adapter of FIG. 1.
Figure 3:
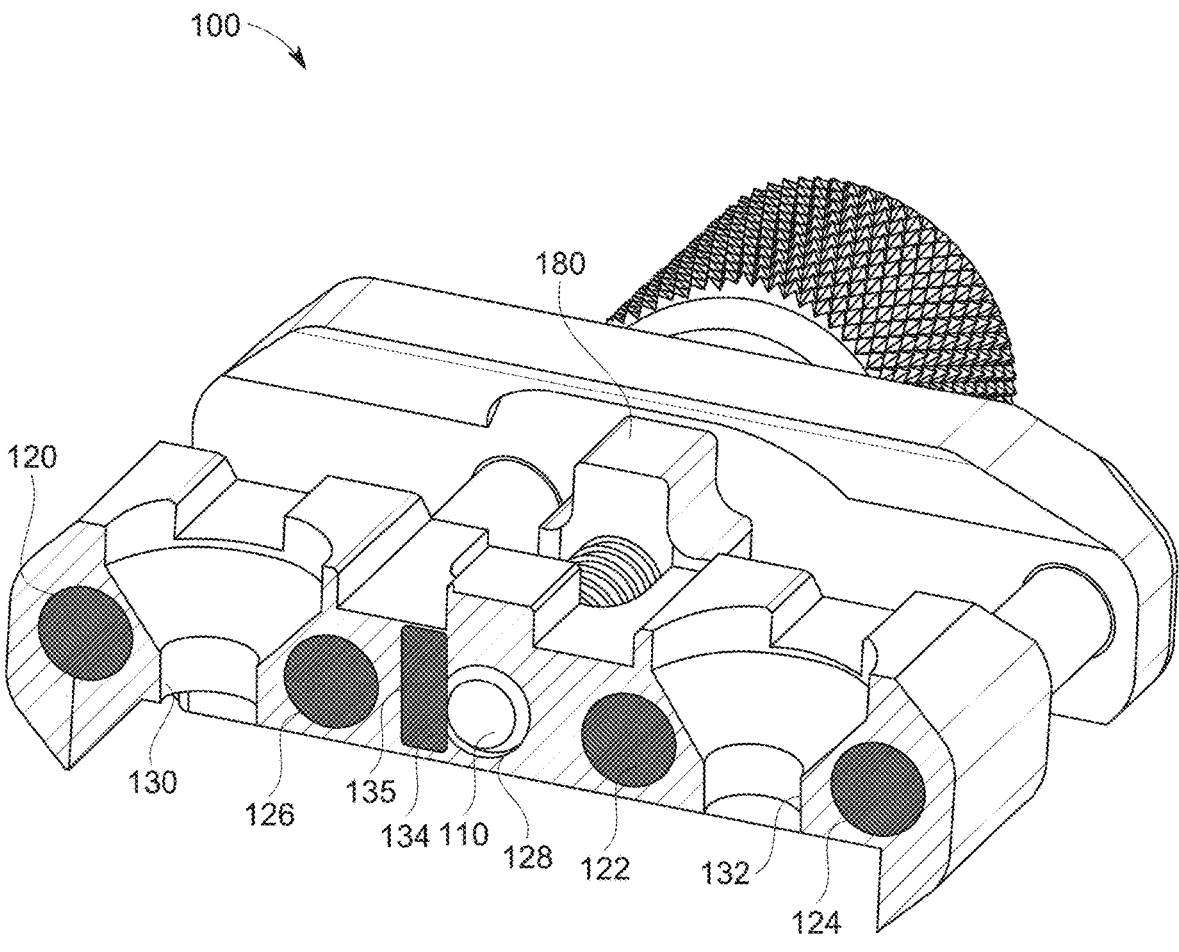
FIG. 3 illustrates a cross section of the QR adapter of FIG. 1 taken along a vertical plane through a center of the body and perpendicular to a longitudinal axis of the threaded rod.

This disclosure describes a quick-release ("QR") adapter, methods of manufacture, and methods of use, that can interface between accessories, firearms, optics, photographic equipment and any other monopod/bipod/tripod-mounted object where both sides of the interface are not the same.

Preliminary note: the flowcharts and block diagrams in the following Figures illustrate the functionality and operation of possible implementations of a selector lever according to various embodiments of the present disclosure. It should be noted that, in some alternative implementations, the functions noted in each block may occur out of the order noted in the figures. For example, two blocks shown in succession may, in fact, be executed substantially concurrently, or the blocks may sometimes be executed in the reverse order, depending upon the functionality involved.

The word "exemplary" is used herein to mean "serving as an example, instance, or illustration." Any embodiment described herein as "exemplary" is not necessarily to be construed as preferred or advantageous over other embodiments.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between two layers, or one or more intervening layers may also be present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

The present disclosure relates generally to a quick release adapter to interface between two firearms or photographic pieces of equipment such as cameras, firearms, rails, tripods, monopods or other stabilizers such as vehicle mounts.

A first side of the QR adapter (e.g., a top) is shaped to couple to both Arca and Picatinny/Weaver/NATO, while a second side (e.g., a bottom) is configured to couple to a support such as a monopod, bipod, or tripod. For instance, the first side can couple to an Arca rail on a firearm or camera tripod plate, while the second side can couple to an ARMS 17S style adapter of a bipod. As another example, the second side can interface a Picatinny rail bipod while the first side couples to an Arca rail of a firearm's forend. As another example, the first side can couple to a Picatinny rail firearm forend while the second side couples to an M-LOK style bipod. These are just a few non-limiting examples to show that the QR adapter can be configured for a variety of interfaces as long as one side includes a dual-interface for Arca and Picatinny/Weaver/NATO. Although firearms, optics, and photographic equipment are three non-limiting examples of objects that the adapter can be used with, other equipment may also use the QR adapter to interface between two interfaces that are otherwise non-compatible.

The following description begins with reference to the embodiment shown in FIGS. 1-6. In FIGS. 7-11 the QR adapter is described along with a portion of a support such as a portion of a bipod. A method of using embodiments of the QR adapter is described relative to FIG. 12 and a method of manufacturing an embodiment of the QR adapter is described relative to FIG. 13.

In an embodiment, the QR adapter 100 is configured to selectively engage a photographic or firearm mount. To this end, the QR adapter 100 includes a distal wing 102, a proximal wing 104, a body 106 arranged between the wings 102 and 104. Each of the proximal wings 102 and 104 includes an angled face 158 and 156. A rod 110 extends between the wings 102 and 104 and through the body 106. The rod 110 can include or be coupled to a knob 108 or other structure that makes it easier for a user to rotate the rod 110. The illustrated knob 108 includes knurling, but other textures could also be used to increase user grip. The rod 110 can be threaded into with the wings 102 and 104, but able to rotate freely within the body 106. For instance, the rod 110 may be threaded including threaded regions separated by a non-threaded region as better seen in FIGS. 2, 4, and 6A and 6B. The rod 110 may include oppositely threaded portions 146 and 148 (see FIG. 2) on opposing ends of the rod 110 that thread into the proximal and distal wings 104 and 106 such that rotation of the rod 110 causes the proximal and distal wings 102 and 106 to come together or move apart. The oppositely-threaded portions 146 and 148 can couple to the wings 102 and 104 and the non-threaded region can rotate within the body 106. The oppositely-threaded portions 146 and 148 can have opposing thread orientations/directions such that rotation of the rod 110 causes the wings 102 and 104 to move in opposite directions along an axis defined by a longitudinal axis of the rod 110. For instance, rotation of the rod 110 in a first direction can cause the wings 102 and 104 to move apart, thereby allowing a mount to be removed or to prepare the QR adapter 100 for insertion of a mount. A mount can be placed between the wings 102 and 104 and atop or in contact with a top of the body 106, and the rod 110 can be rotated in a second direction causing the wings 102 and 104 to slide toward each other and clamp the mount between the wings 102 and 104 and the body 106.

This clamping is enhanced by angled faces 156 and 158 or claws, which have a similar or a same angle to corresponding angled faces 182 and 184 of the mount. The angled faces 156 and 158 can each be angled from a vertical toward the body 106 (i.e., angled from the vertical plane toward the opposing wing). This vertical plane is not shown but can be envisioned as perpendicular to a longitudinal axis through the rod 110. When the proximal and distal wings 104 and 102 slide together, the angled faces 158 and 156 clamp the mount to the body 106. The angled faces 156 and 158 are angled from a plane perpendicular to the longitudinal axis of the rod 110 toward the body 106. The angled faces 156 and 158 can be configured to contact angled faces of the photographic or firearm mount during clamping (i.e., they can have the same or a similar angle to an angle of the photographic or firearm mount) regardless as to whether the mount is an Arca or Picatinny/Weaver/NATO type.

The wings 102 and 104 are configured to slide toward each other when the rod 110 is rotated such that the first and second angled faces 156 and 158 clamp the photographic or firearm mount to the body 106. These angled faces 156 and 158 are configured to create a compressive force between them as well as a downward component of force toward a top of the body 106. This force against the body 106 exists regardless of the orientation of the body 106 (e.g., even when upside down, the wings 102 and 104 will still press the mount against the body 106). Thus, the term "top" is only used relative to the illustrated orientations and in no way is intended to limit the QR adapter 100 to a particular orientation.

The body 106 can couple to the support via one or more fasteners, such as screws, where two fastener openings 130 and 132 are shown in the top of the body 106. The fasteners and fastener openings 130 and 132 can be arranged substantially perpendicularly to the rod 110.

Figure 4:
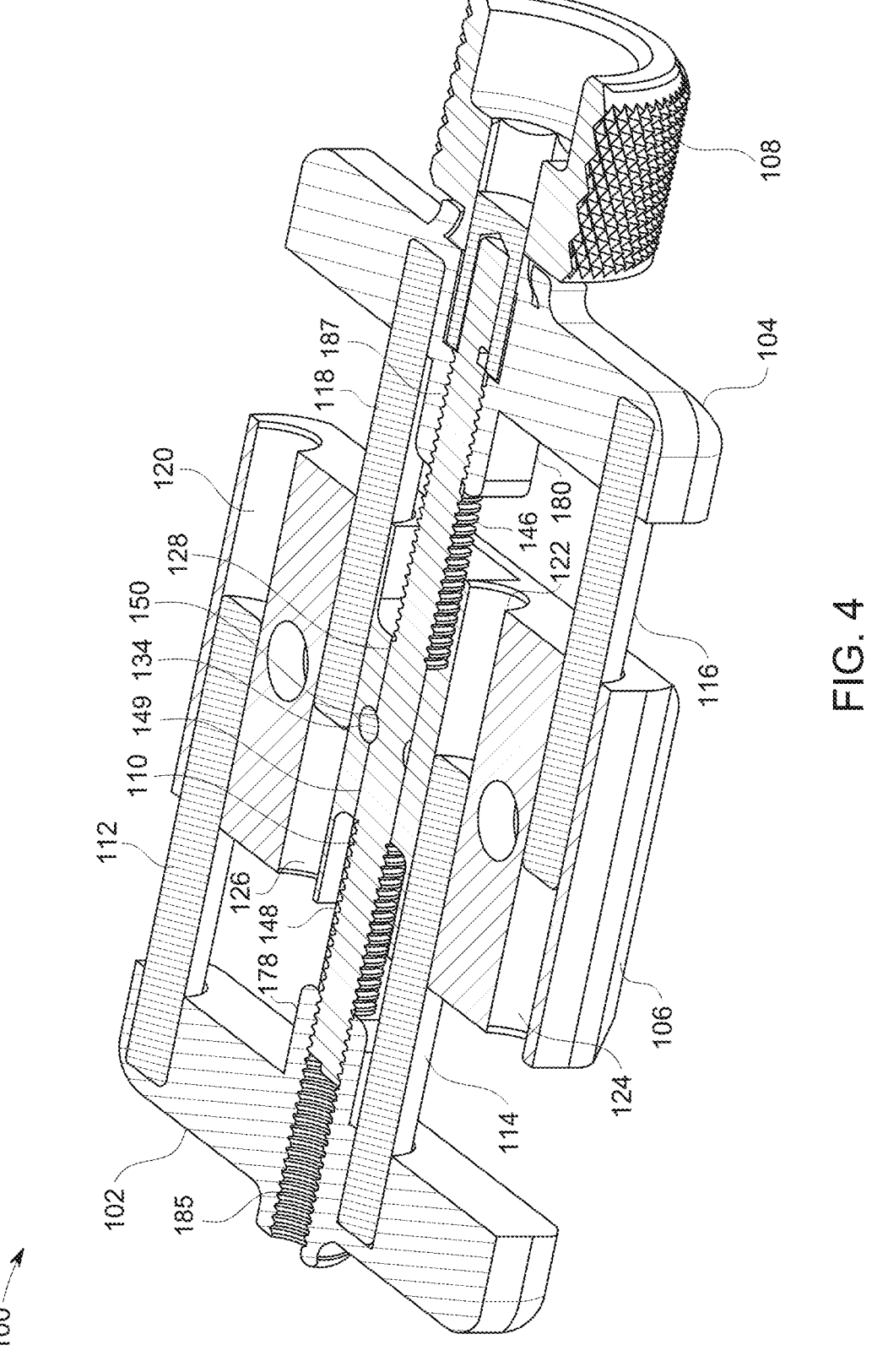
FIG. 4 illustrates another cross section of the QR adapter of FIG. 1 taken along a horizontal plane parallel to and coincident with the longitudinal axis of the threaded rod.

FIG. 4 shows a cross section of the QR adapter taken along a horizontal plane. The wings 102 and 104 may each include a threaded aperture 185 and 187, respectively, configured to coupled to the threaded regions 148, 146—of the rod 110. The body 106 can include a first horizontal aperture 128 (see also FIG. 3) that is non-threaded. In other words, the threaded rod 110 can extend between the threaded apertures 187 and 185 in the proximal and distal wings 104 and 102 and through the non-threaded aperture in the body 106. As noted above, the rod 110 can include oppositely threaded portions (distal threaded portion 148 and proximal threaded portion 146) that each thread into a respective one of the wings 102, 104 such that rotation of the rod 110 causes the wings 102, 104 to clamp together (move toward each other and toward the body 106) or spread apart (move away from each other and away from the body 106) at equal rates. However, one of skill in the art will appreciate that use of asymmetric threads will cause asymmetric speed of movement of the wings 102, 104.

Figure 6A:
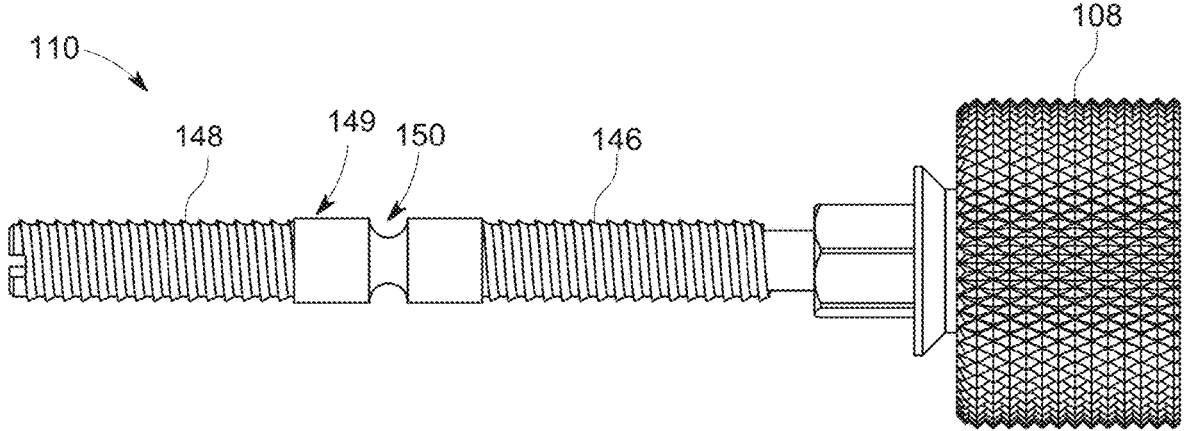
FIG. 6A illustrates a profile view of the threaded rod and the knob.
Figure 6B:
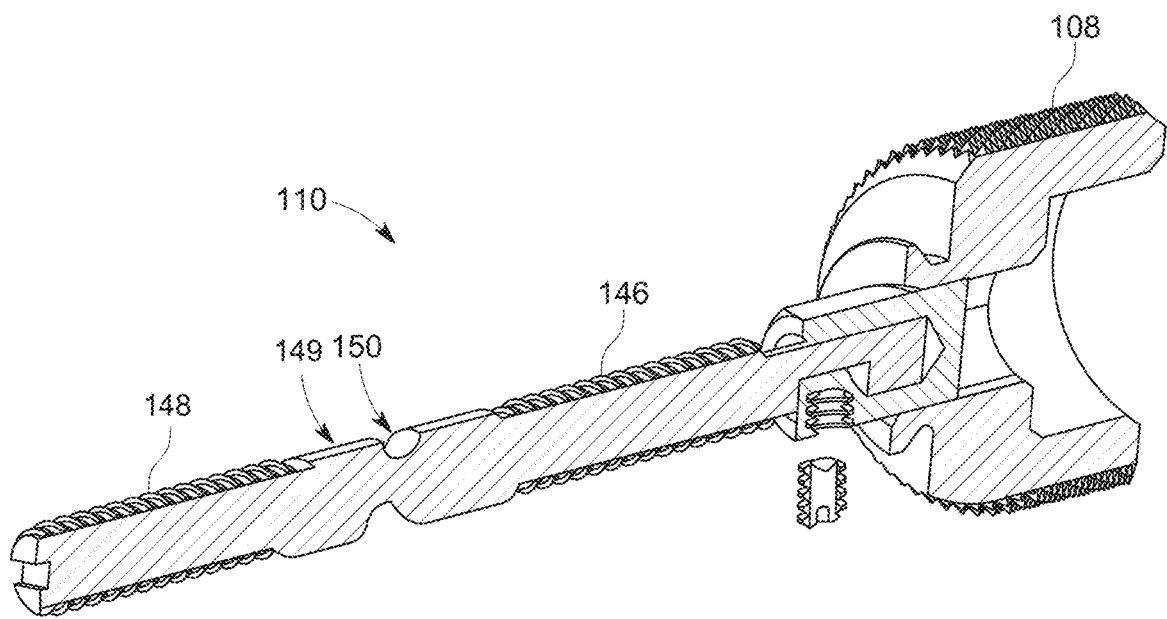
FIG. 6B illustrates a cross section of the threaded rod and knob in FIG. 6A.

FIGS. 6A and 6B show details of an embodiment of the rod 110. The rod 110 includes a non-threaded central region 149 and a groove 150, where the non-threaded central region 149 is positioned between the distal and proximal threaded portions 148, 146 within at least the first horizontal aperture 128, and where the groove 150 runs around a circumference of of the non-threaded central region 149 extending around the circumference of the rod 110. The groove 150 can have a semi-circular cross section that is similar to or matches a cross section of a vertical pin 134 (see FIGS. 3 and 4). The non-threaded central region 149 can be sized to sit within the first horizontal aperture 128 in the body 106. The vertical pin 134 can be arranged within a vertical aperture 135 (see FIG. 3) in the body 106 that aligns with the groove in the rod 110, thereby preventing the rod 110 from moving longitudinally. The pin 134 passes through a side of the first horizontal aperture 128 and also passes through a portion of the groove 150 (see FIGS. 3 and 4). The shape of the groove 150 and the vertical pin 134 have the same or similar cross sections when viewed from above and thus allow the rod 110 to rotate within the first horizontal aperture 128, but prevent lateral movement of the rod 110 along a longitudinal axis of the rod 110 and the first horizontal aperture 128. In other words, the vertical pin 134 secures the rod 110 within the body 106 enabling axial rotation of the rod 110 and allowing the wings 102, 104 to move toward and away from the body 106 in a symmetric fashion. Said another way, the pin 134 ensures that the rod 110 does not move longitudinally relative to the body 106.

The wings 102, 104 each include a vertical face 152, 154 and an angled face or claw 156, 158 arranged above the respective vertical faces 152, 154. The vertical faces 152, 154 are parallel (or substantially parallel) to vertical faces 164, 166 along a distal side 160 and a proximal side 162 of the body 106. The angled claws 156, 158 can be substantially parallel with angled upper faces 168, 170 of the body 106 as well as similar angled upper faces of the mount (e.g., photographic or firearm mount; Arca or Picatinny/Weaver/NATO). Examples of the QR adapter 100 interfacing with both types of mounts can be seen in FIG. 10. Even with narrower mounts, the QR adapter 100 may be designed such that the wings 102 and 104 do not touch the body 106 when fully closed, as this allows the QR adapter 100 to secure various mounts even when the mount is out of spec. The angled faces 156, 158 of the wings 102, 104 are shaped and configured to contact and meet flush with angled faces on the mount regardless as to whether the mount is an Arca (e.g., 182) or Picatinny/Weaver/NATO type (e.g., 184).

To prevent the wings 102, 104 from rotating around the rod 110 and to generally add stability, the QR adapter 100 can include one or more dowels 112, 114, 116, 118. Four dowels are shown in this embodiment, but more or less than four can also prevent rotation of the wings 102, 104 around the longitudinal axis through the rod 110 (or rotation relative to the body 106). For instance, at least one dowel can extend between the proximal wing 102 and the body 106 and at least one dowel can extend between the distal wing 104 and the body 106. The dowels 112, 114, 116, 118 can pass at least partially through corresponding horizontal apertures 120, 122, 124, 126, in the body 106. Each of the one or more dowels 112, 114, 116, 118 can be affixed to one of the wings 102, 104 or freely inserted into corresponding apertures in the wings 102, 104. In this embodiment, the first dowel 112 passes at least partially through a second horizontal aperture 120 in the body 106 and is coupled to the distal wing 102 while the second dowel 114 passes at least partially through a third horizontal aperture 122 in the body 106 and is coupled to the distal wing 102. In this embodiment, the third dowel 116 passes at least partially through a fourth horizontal aperture 124 in the body 106 and is coupled to the proximal wing 104 while the fourth dowel 118 passes at least partially through a fifth horizontal aperture 126 in the body 106 and is coupled to the proximal wing 104. As the rod 110 is rotated, the wings 102, 104 move toward or away from the body 106—the dowels 112, 114, 116, 118 sliding further into the horizontal apertures 120, 122, 124, 126 when the wings 102, 104 move together—and the dowels 112, 114, 116, 118 sliding outward through the horizontal apertures 120, 122, 124, 126 when the wings 102, 104 move apart. The dowels 112, 114, 116, 118 can be fixed to the wings, or loosely engaged with the apertures in the wings.

Figure 5:
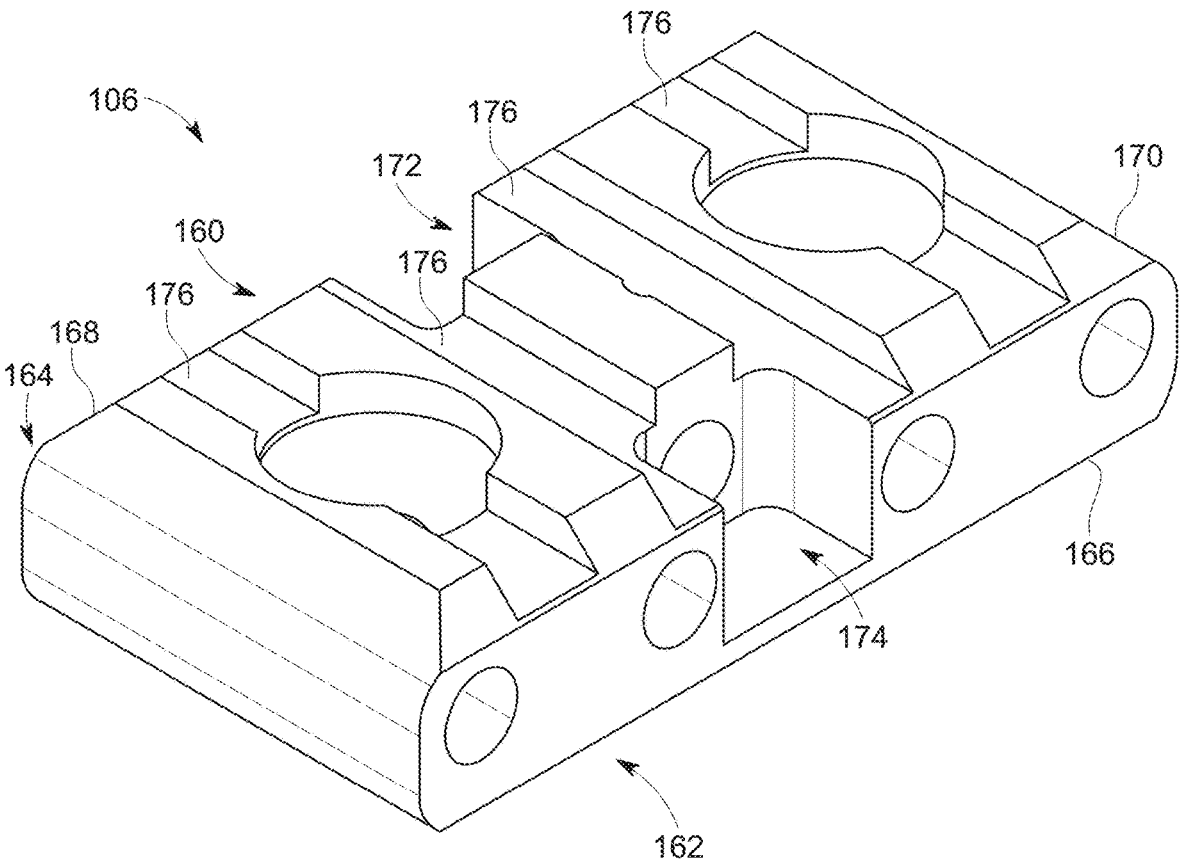
FIG. 5 illustrates the body in isolation.

FIG. 5 illustrates the body 106 in isolation. The body 106 includes a proximal side 162, a distal side 160, a proximal vertical face 166, a distal vertical face 164, a proximal angled face 170, and a distal angled face 168. A proximal notch 174 and a distal notch 172 can be arranged through a central portion of the body 106 around where the rod 110 passes. These notches 172, 174 are shaped to accept protruding blocks 178, 180 of the wings 102, 104 (see FIGS. 1 and 3), the protruding blocks 178, 180 helping to provide additional structure (i.e., strength and rigidity) for the rod 110 to pass through in the wings 102, 104. In other words, these protruding blocks 178 and 180 provide a stronger structure in the wings 102 and 104 for the rod 110 to interact with. They also provide a longer threaded region within the wings 102, 104. The body 106 further includes grooves 176 having depth, width, and spacing that will accept the grooved surface of a Picatinny/Weaver/NATO interface as seen for instance in FIGS. 9B and 11B.

Figure 10A:
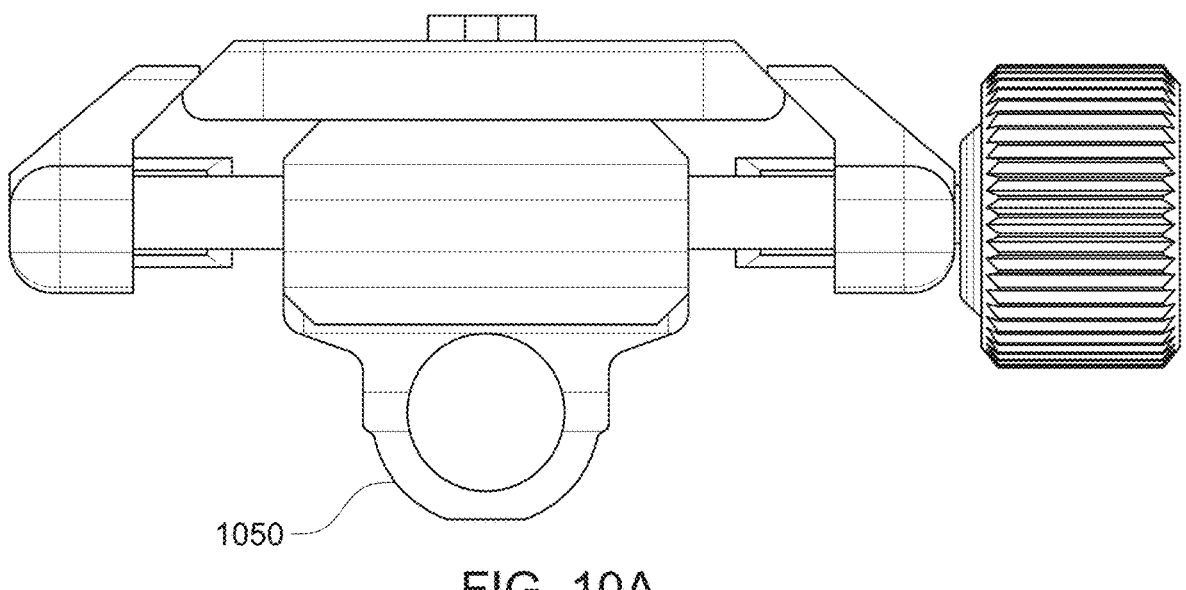
FIG. 10A shows a front profile view of the embodiment of the QR adapter and Arca-type mount seen in FIGS. 7 and 9A.
Figure 10B:
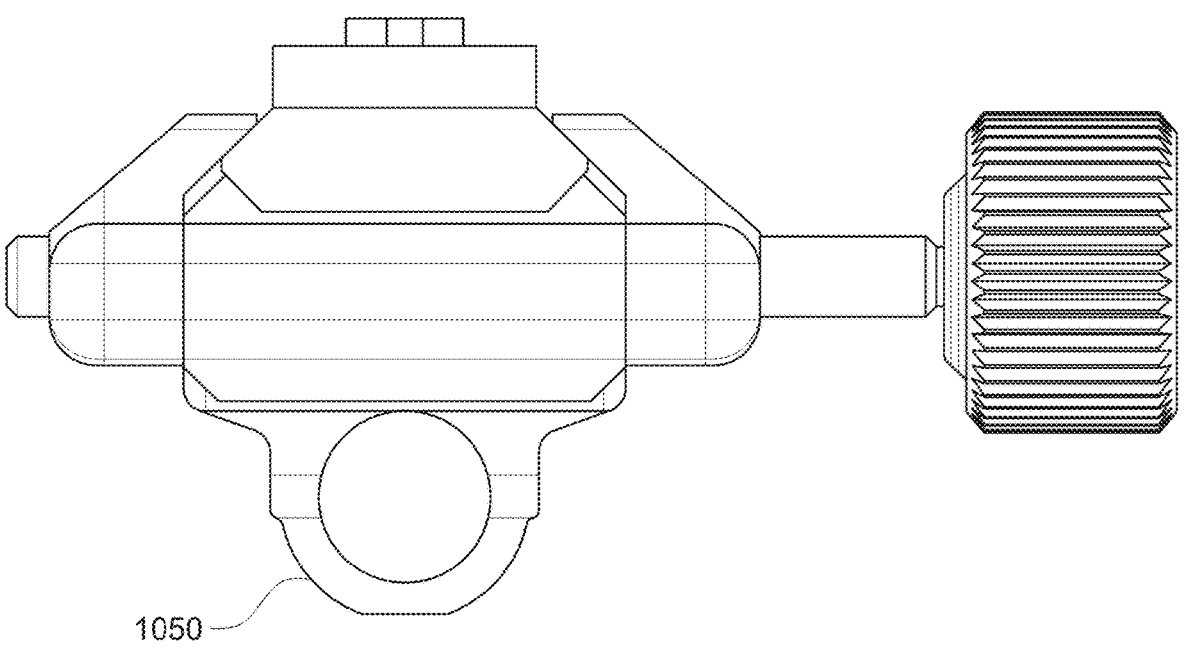
FIG. 10B shows a front profile view of the embodiment of the QR adapter and Picatinny/Weaver/NATO-type mount seen in FIGS. 8 and 9B.

FIGS. 10A and 10B show front profile views of an embodiment of the QR adapter, illustrating how the adapter can clamp onto two different rail interfaces (e.g., Arca and Picatinny/Weaver/NATO). These illustrations also show a portion of a bipod 1050 that is configured to rotatably couple to the rest of a MAGPUL bipod (not shown), though other support structures can also be used in place of this exemplary bipod (e.g., monopods and tripods).

FIGS. 15A and 15B show left side profile views of the QR adapter with the distal/left wing hidden to show how the different rail styles sit atop (Arca) or nestle within the grooves (Picatinny/Weaver/NATO) of the body. As seen in FIG. 15B, the grooves 176 can have a depth that is less than a depth of grooves in the Picatinny/Weaver/NATO rail, although this is not required.

Figure 7:
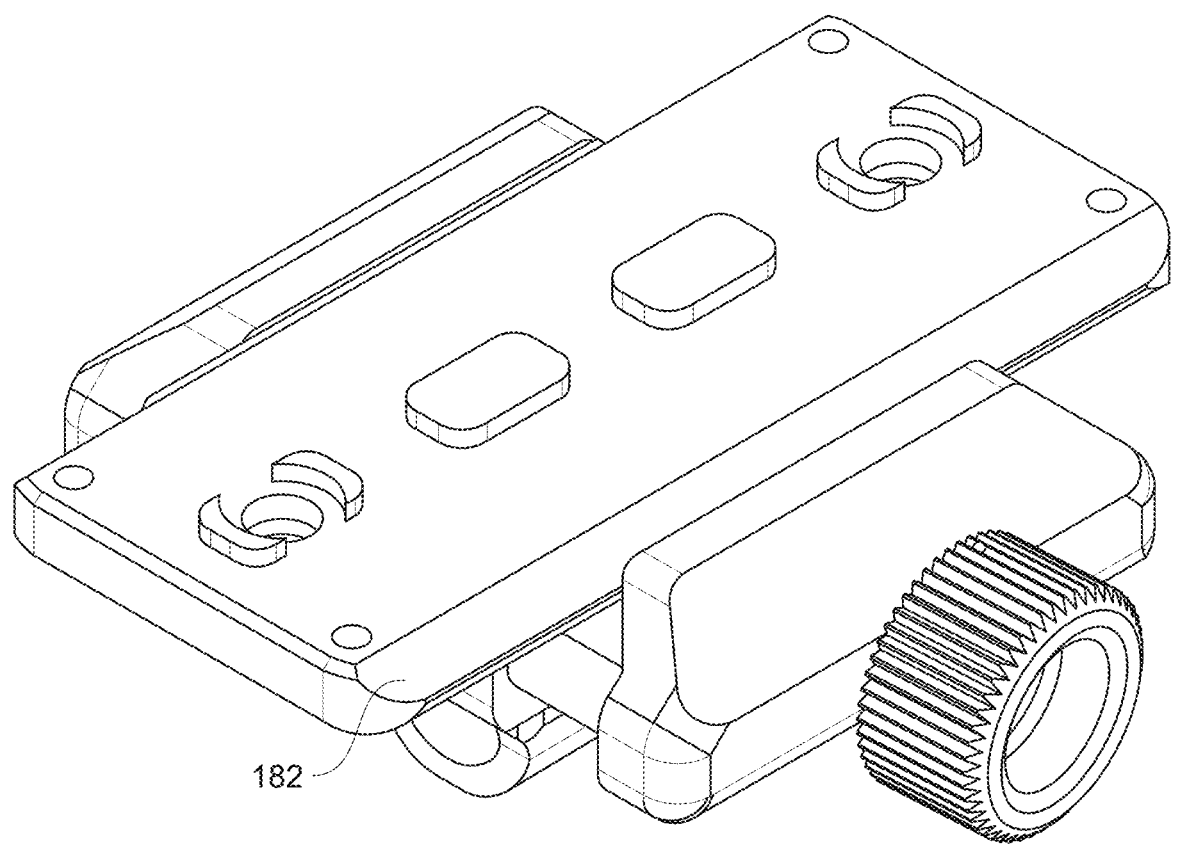
FIG. 7 illustrates an embodiment of the QR adapter clamped to an Arca-type mount on a first side and to a portion of a monopod/bipod/tripod on a second side.
Figure 8:
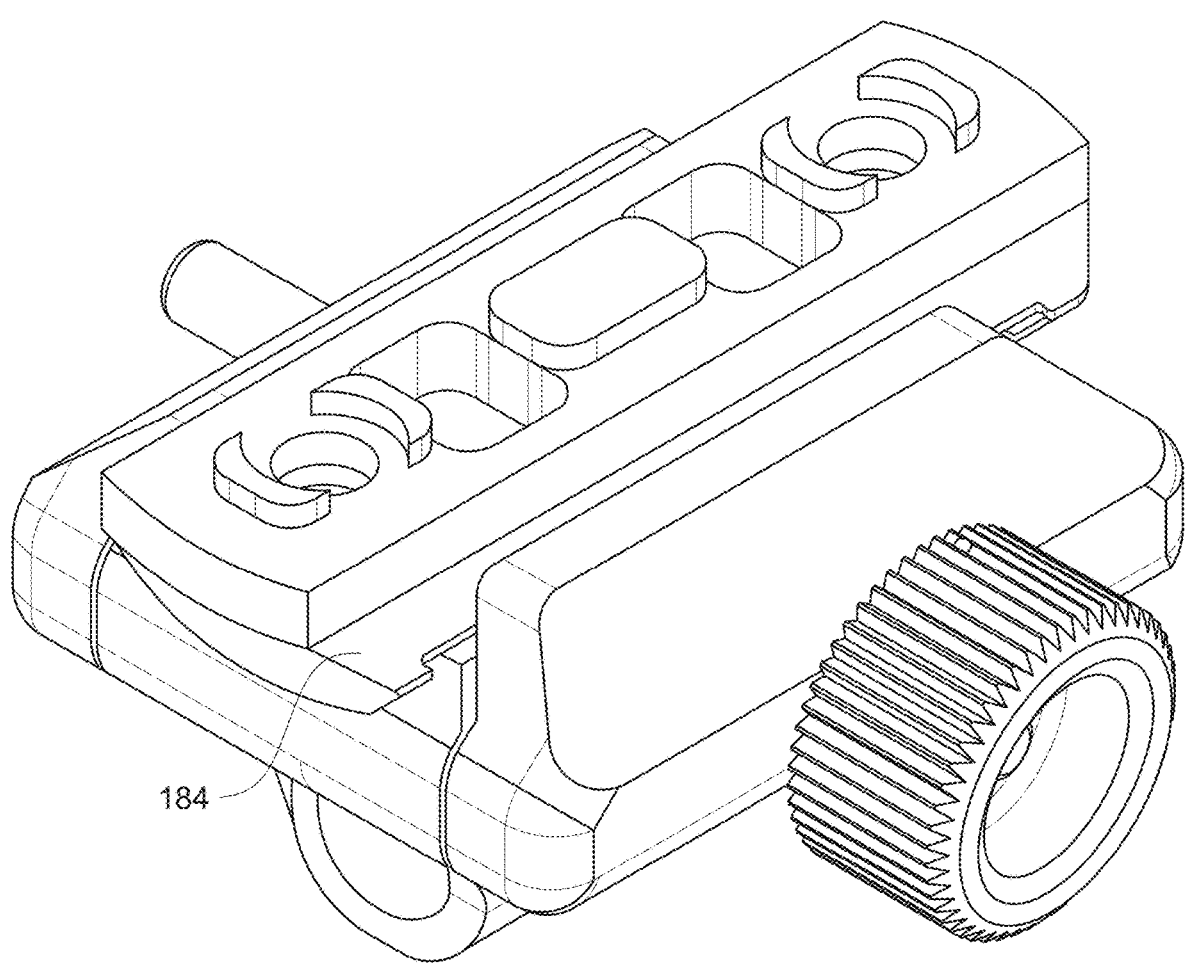
FIG. 8 illustrates an embodiment of the QR adapter clamped to a Picatinny/Weaver/NATO-type mount on the first side and to a portion of the monopod/bipod/tripod on the second side.

FIGS. 7-11 illustrate a simplified drawing of an embodiment of the QR adapter and thus certain details of the actual implementation are not visible. For instance, the two oppositely threaded portions may be implemented although not shown. FIGS. 7, 8, and 10 help to show how the QR adapter is able to couple to a first and second type of mount merely by closing the wings to different extents.

Figure 9A:
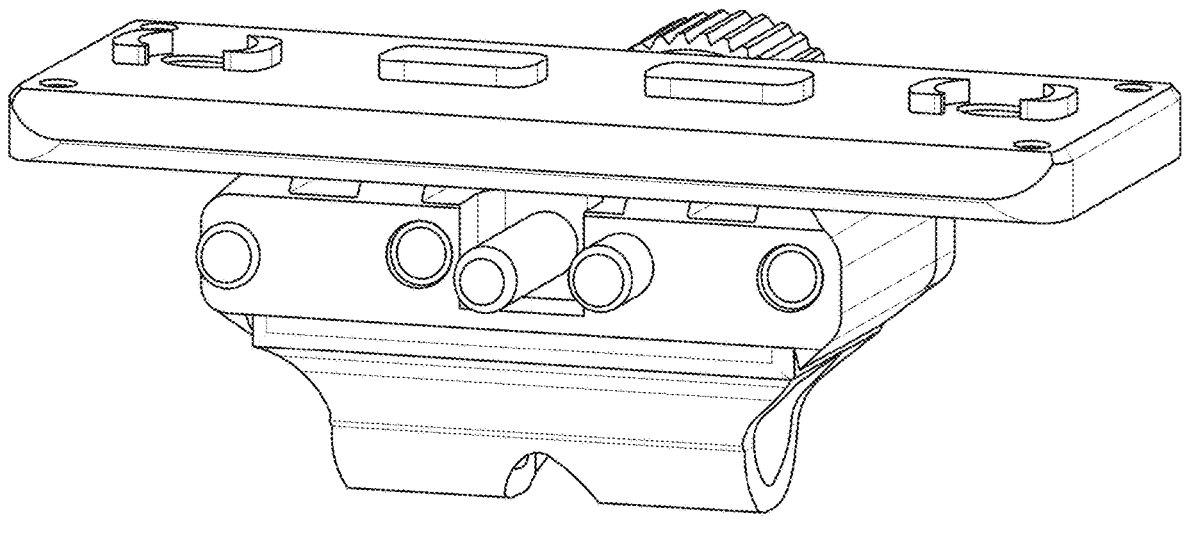
FIG. 9A illustrates an isometric view of FIG. 7 with the distal wing hidden.

FIGS. 7 and 9A illustrate a QR adapter with a first type of firearm or photographic mount clamped between the wings on a first side of the QR adapter. This firearm mount includes an M-LOK interface that may lock into, for instance, one or more M-LOK grooves on a forend, stock, or other portion of a firearm. The second side of the QR adapter (a bottom in this image) includes a portion of a bipod mount (the rest of the bipod is hidden for ease of visibility). Thus, FIG. 7 helps to show how a first side of the QR adapter (e.g., a top) couples to a photographic or firearm mount, and a second side of the QR adapter (e.g., a bottom) couples to a monopod, bipod, or tripod. In the illustrated embodiment, the first type of mount is an Arca type mount. FIG. 9A is illustrated with the distal wing hidden.

Figure 9B:
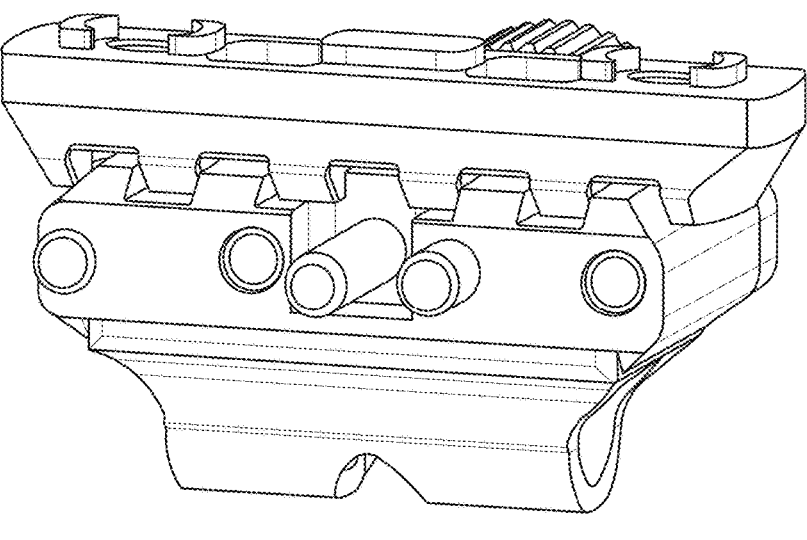
FIG. 9B illustrates an isometric view of FIG. 8 with the distal wing hidden.

FIGS. 8 and 9B illustrate a QR adapter with a second type of firearm or photographic mount clamped between the wings on a first side of the QR adapter. This firearm mount also includes an M-LOK interface that may lock into, for instance, one or more M-LOK grooves on a forend or other portion of a firearm. The second side of the QR adapter (a bottom in this image) includes a portion of a bipod mount (the rest of the bipod is hidden for ease of visibility). Thus, FIG. 8 helps to show how a first side of the QR adapter (e.g., a top) couples to a photographic or firearm mount, and a second side of the QR adapter (e.g., a bottom) couples to a monopod, bipod, or tripod. In the illustrated embodiment, the second type of mount is a Picatinny/Weaver/NATO type mount. FIG. 9B is illustrated with the distal wing hidden.

FIG. 10A illustrates a front or rear elevation view of the QR adapter clamped onto the first type of mount, as also seen in FIGS. 7 and 9A. FIG. 10B illustrates a front or rear elevation view of the QR adapter clamped onto the second type of mount, as also seen in FIGS. 8 and 9B. One sees that the body is designed such that the first type of mount in FIG. 10A rests atop the grooves on a top of the body, while the second type of mount in FIG. 10B rests partially within those groove and partially atop them (in other words, the second type of mount can have similarly-shaped and sized grooves). One also sees that even where the second type of mount is clamped, a gap between the angled faces of the wings and the body can remain, to provide tolerance for differences in sizes of the various illustrated components.

Figure 11A:
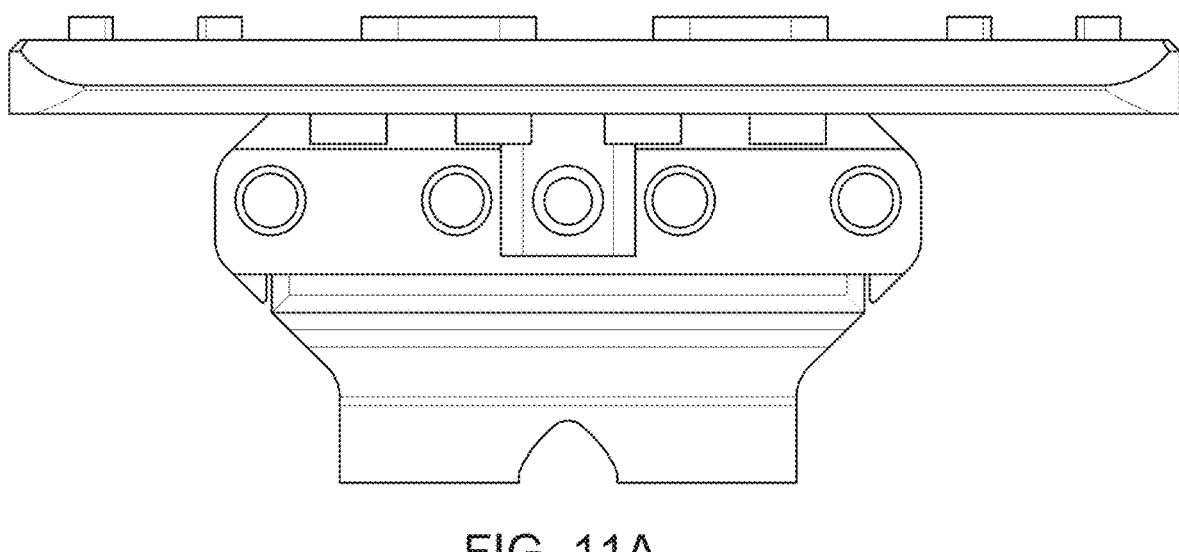
FIG. 11A shows a side elevation view of the embodiment of the QR adapter and Arca-type mount seen in FIGS. 7, 9A, and 10A.
Figure 11B:
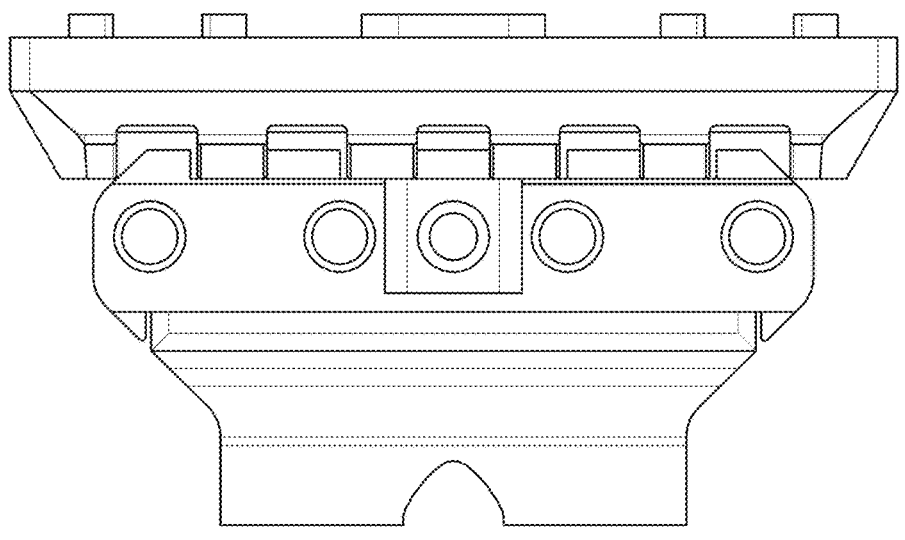
FIG. 11B shows a side elevation view of the embodiment of the QR adapter and Picatinny/Weaver/NATO-type mount seen in FIGS. 8, 9B, and 10B.

FIGS. 11A and 11B illustrate side profile views of the QR adapter clamped onto the first and second type of mount, respectively, as also seen in FIGS. 7, 9A, and 10A and FIGS. 8, 9B, and 10B, respectively. This view also helps to show how the first mount type rests atop the grooves in the body, and the second mount type rests partially within and partially atop the grooves in the body.

FIG. 12 illustrates a method of using a QR adapter according to an embodiment of this disclosure. The method 1200 can include rotating a threaded rob or knob of the QR adapter in a first direction causing opposing wings of the QR adapter to move apart with a body arranged therebetween (Block 1202). A plate, rail, or other structure according to Arca or Picatinny/Weaver/NATO specifications can be inserted through an opening between the wings and onto a body of the QR adapter (Block 1204). For an Arca-style interface, the structure can rest atop the body as shown, for instance, in FIGS. 7, 9A, 10A, and 11A. For a Picatinny-/Weaver-/NATO-style interface, the structure can nest in grooves in the body and on top of the grooves thereby being seated lower than an Arca-style interface. An example of this interfacing can be seen in FIGS. 8, 9B, 10B, and 11B. The threaded rod or knob can then be rotated in a second direction thereby causing the two opposing wings of the QR adapter to move toward each other can clamp the mount between the angled faces of the two wings and the body (Block 1206). In other words, the rod or knob can be rotated until the wings clamp upon or contact angled surfaces of the structure (e.g., plate or rail) being clamped in the QR adapter (Decision 1208=Yes).

Figure 13:
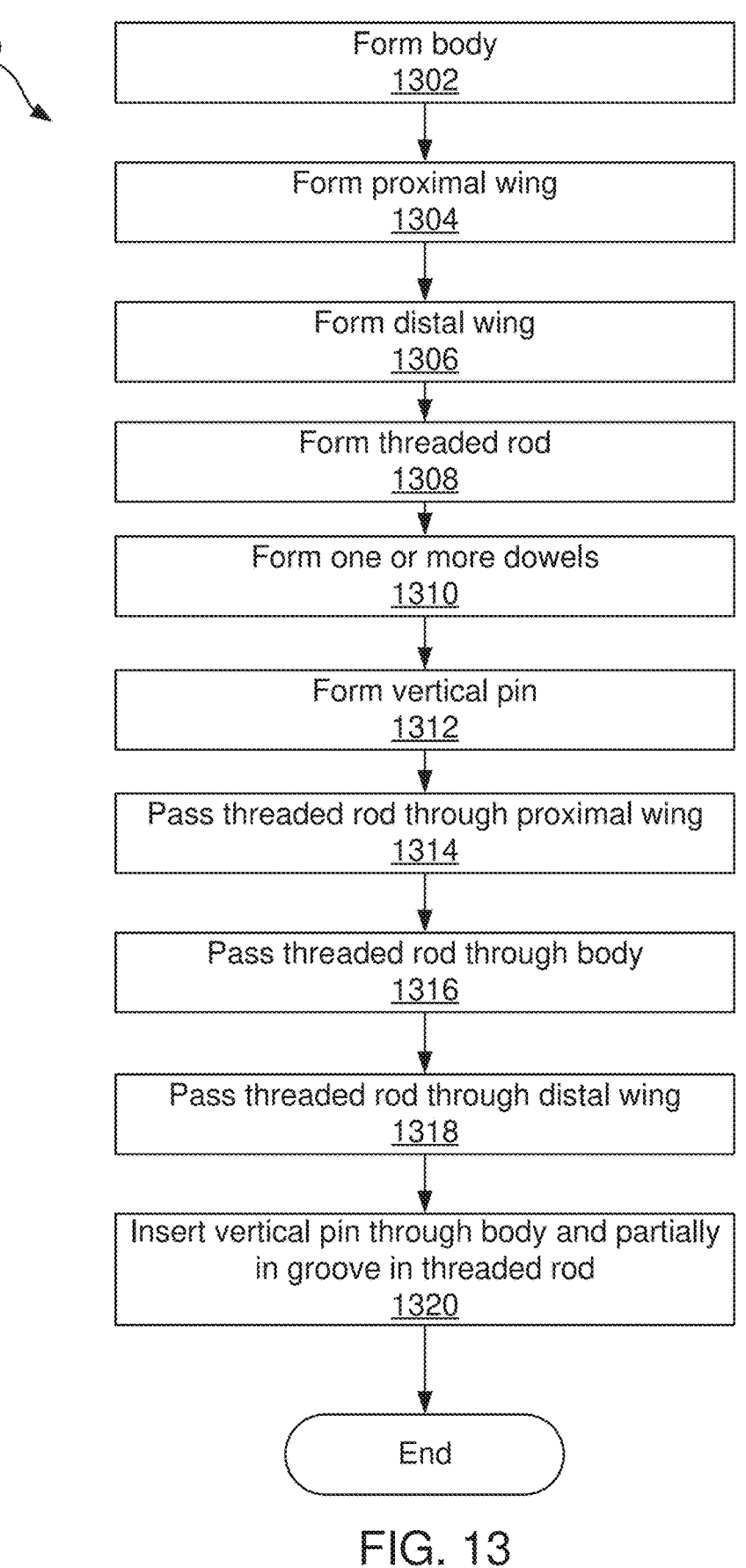
FIG. 13 illustrates a method of manufacturing a QR adapter according to an embodiment of this disclosure.

FIG. 13 illustrates a method of manufacturing a QR adapter according to an embodiment of this disclosure. The method 1300 can include forming a body (Block 1302), forming a proximal wing (Block 1304), forming a distal wing (Block 1306), forming a threaded rod (Block 1308), forming one or more dowels (Block 1310), and forming a vertical pin (Block 1312). The method 1300 can then include passing the threaded rod through the proximal wing (Block 1314) the body (Block 1316) and the distal wing (Block 1318). The vertical pin (e.g., 134) can be passed through a vertical aperture (e.g., 135) in the body and partially through a groove (e.g., 150) in or near a center of the threaded rod (Block 1320) such that the threaded rod is secured within the body from longitudinal movement along a longitudinal axis of the threaded rod, but not from rotation around the rod's longitudinal axis. The one or more dowels (e.g., 112, 114, 116, 118) can be part of or affixed to the wings (e.g., 102, 104) and can be passed at least partially through corresponding apertures in the body (e.g., 120, 122, 124, 126) when the threaded rod (e.g., 110) is passed through the wings and body (e.g., 106).

In some embodiments, a quick-release adapter is disclosed having a body, a threaded rod, a proximal wing, and a distal wing. The body can include a first aperture arranged between a top and bottom of the body and a second longitudinal aperture through the body. The threaded rod can pass through the second longitudinal aperture and have a first and second end with opposing threading directions. A proximal wing on a first side of the body can include a first face angled toward the body. The proximal wing can also include a third threaded aperture that holds the first end of the threaded rod. The distal wing on a second side of the body can include a second face angled toward the body and a fourth threaded aperture that holds the second end of the threaded rod. The threaded rod can pass through the proximal wing and comprise a knob on an end that protrudes from the proximal wing. Rotation of the knob can cause rotation of the threaded rod, which in turn causes the proximal and distal wings to move toward or away from the body and thereby capture or release a photographic or firearm mount between the first and second angled faces.

Other embodiments can be described as a method of forming a quick-release adapter for a firearm or photographic equipment. The method can include forming a body, forming a proximal wing, forming a distal wing, forming a threaded rod having a centrally-located groove and two threaded ends with oppositely directed threading. The method can also include forming a threaded rod having a centrally-located groove and two threaded ends with oppositely directed threading. The method can also include forming one or more dowels affixed to one or more of the proximal and distal wings, and forming a vertical pin and a corresponding vertical aperture in the body. The method can yet further include passing the threaded rod through the proximal wing to form a threaded coupling therewith, passing the threaded rod through the body, and passing the threaded rod through the distal wing to form a threaded coupling therewith. The method can yet further include inserting the vertical pin through the vertical aperture in the body and at least partially through the groove in the body to centrally secure the threaded rod relative to the body, the distal wing, and the proximal wing.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An apparatus for selectively engaging a mount, said apparatus comprising:
a proximal wing comprising a first angled face;
a distal wing comprising a second angled face;
a body arranged between the proximal and distal wings;
a threaded rod extending between the proximal and distal wings and through the body; and
at least one first dowel extending between the proximal wing and the body and at least one second dowel extending between the distal wing and the body,
wherein the first and second angled faces are angled from a vertical plane toward the body, and wherein the proximal and distal wings are configured to slide toward each other such that the first and second angled faces clamp the mount to the body,
wherein an upper surface of the body is configured to support a lower surface of the mount, and
wherein the angled faces of the wings are configured to clamp angled faces of the mount by rotation of the threaded rod and movement of the wings toward each other.

2. The apparatus of claim 1, wherein the rod comprises oppositely threaded portions on opposing ends of the rod that thread into the proximal and distal wings such that rotation of the rod causes the proximal and distal wings to come together or move apart.

3. The apparatus of claim 2, wherein the rod further comprises a groove running around its circumference between the oppositely threaded portions.

4. The apparatus of claim 3, wherein a pin is arranged within an aperture in the body that aligns with the groove in the rod, thereby preventing the rod from moving longitudinally.

5. The apparatus of claim 1, wherein the mount is one of a photographic mount or a firearm mount.

6. The apparatus of claim 1, wherein a first side of the body couples to the mount and a second side of the body couples to a monopod, bipod, or tripod.

7. The apparatus of claim 1, wherein the mount is either a mount of a first type or a mount of a second type; wherein the mount of the first type is arranged on a top of the body and the mount of the second type is arranged within grooves on a top of the body, the grooves being parallel to the threaded rod.

8. A quick-release adapter for coupling a support to a photographic or firearm mount, the quick-release adapter comprising:

a proximal wing comprising an angled face;

a distal wing comprising an angled face;

a body arranged between the proximal and distal wings, wherein an upper surface of the body is configured to support a lower surface of the mount; and a threaded rod extending between threaded apertures in the proximal and distal wings and through a non-threaded aperture in the body, wherein the proximal wing and the distal wing move toward each other in response to the threaded rod rotating in a first direction, wherein the angled faces of the wings are configured to clamp angled faces of the mount by rotation of the threaded rod and movement of the wings toward each other, and wherein the proximal wing and the distal wing are configured to force the mount to the body in response to the proximal wing and the distal wing moving toward each other.

9. The quick-release adapter of claim 8, wherein the proximal and distal wings comprise angled faces that are configured to contact corresponding angled faces on the mount regardless as to whether the mount is an Arca or Picatinny/Weaver/NATO type.

10. The quick-release adapter of claim 8, wherein the body is configured to be secured to a monopod, bipod, or tripod via one or more fasteners arranged substantially perpendicularly to the threaded rod.

11. The quick-release adapter of claim 8, wherein the threaded rod includes a non-threaded region between two threaded regions, and wherein the two threaded regions have opposing thread orientations.

12. A method of coupling to a mount, the method comprising:

rotating a threaded rod of an adapter in a first direction thereby causing two opposing wings of the adapter to move apart with a body arranged therebetween, wherein the body is arranged between the two opposing wings, and wherein the threaded rod extends between threaded apertures in the two opposing wings and through a non-threaded aperture in the body;

arranging a lower surface of the mount in contact with an upper surface of the body between angled faces of the two opposing wings; and rotating the threaded rod in a second direction thereby causing the two opposing wings of the adapter to move toward each other and clamp angled faces of the mount between the angled faces of the two opposing wings, which clamps the mount to the body.

13. The method of claim 12, wherein the mount is an Arca type mount or a Picatinny/Weaver/NATO type mount; wherein the Arca type mount is arranged on a top of the body and the Picatinny/Weaver/NATO type mount is arranged within grooves on a top of the body, the grooves being parallel to the threaded rod.

14. The method of claim 12, wherein a first side of the body is configured to couple to the mount and a second side of the body is configured to couple to a monopod, bipod, or tripod.

15. The method of claim 12, wherein rotating the threaded rod in the second direction further causes the two opposing wings to press the mount to the body.

16. The method of claim 12, wherein the mount is either a mount of a first type or a mount of a second type; wherein the mount of the first type is arranged on a top of the body and the mount of the second type is arranged within grooves on a top of the body, the grooves being parallel to the threaded rod.

\* \* \* \* \*